(12) United States Patent
Speldrich et al.

(10) Patent No.: US 12,399,046 B2
(45) Date of Patent: Aug. 26, 2025

(54) FLOW SENSING APPARATUS

(71) Applicant: Honeywell International Inc., Charlotte, NC (US)

(72) Inventors: Jamie Speldrich, Freeport, IL (US); Richard Sorenson, Columbus, OH (US); William Hoover, Columbus, OH (US)

(73) Assignee: Honeywell International Inc., Charlotte, NC (US)

( * ) Notice: Subject to any disclaimer, the term of this patent is extended or adjusted under 35 U.S.C. 154(b) by 168 days.

(21) Appl. No.: 18/178,300

(22) Filed: Mar. 3, 2023

(65) Prior Publication Data

US 2024/0295423 A1    Sep. 5, 2024

(51) Int. Cl.
*G01F 1/48* (2006.01)

(52) U.S. Cl.
CPC ..................................... *G01F 1/48* (2013.01)

(58) Field of Classification Search
CPC ....................................................... G01F 1/48
See application file for complete search history.

(56) References Cited

U.S. PATENT DOCUMENTS

| | | | |
|---|---|---|---|
| 4,389,901 A | 6/1983 | Lake | |
| 4,821,768 A | 4/1989 | Lett | |
| 6,874,375 B1* | 4/2005 | Grenning | G01F 1/40 73/861.63 |
| 6,915,705 B1 | 7/2005 | Truitt et al. | |
| D654,385 S | 2/2012 | Ike | |
| 8,695,417 B2* | 4/2014 | Speldrich | G01F 1/6845 73/204.22 |
| 9,003,877 B2 | 4/2015 | Qasimi et al. | |
| 9,612,146 B2 | 4/2017 | Speldrich et al. | |
| 9,952,079 B2 | 4/2018 | Speldrich et al. | |
| 2004/0163463 A1 | 8/2004 | Ito et al. | |
| 2006/0086194 A1* | 4/2006 | Olin | G05D 7/0635 73/861.52 |

(Continued)

FOREIGN PATENT DOCUMENTS

| | | |
|---|---|---|
| CN | 307324010 | 5/2022 |
| JP | 2005-024352 A | 1/2005 |

(Continued)

OTHER PUBLICATIONS

Honeywell, "Honeywell Zephyr™ Analog Airflow Sensors," Datasheet, 32308685-A-EN IL50, 1-12, (Jun. 2015).

(Continued)

*Primary Examiner* — Alexander A Mercado
(74) *Attorney, Agent, or Firm* — Alston & Bird LLP

(57) ABSTRACT

Various methods, apparatuses, and systems for improving sensitivity and performance of a flow sensing apparatus are provided. The flow sensing apparatus includes: a housing defining an inlet port and an outlet port; a sensing element disposed at least partially within the housing; a main flow path defined within the housing connecting the inlet port and the outlet port, where the main flow path is disposed proximate the sensing element such that at least a portion of the flowing media is in fluid contact with the sensing element; and a laminarizing structure located in the inlet port and configured to direct a flowing media in a laminar flow pattern.

17 Claims, 8 Drawing Sheets

(56) References Cited

U.S. PATENT DOCUMENTS

| | | | | |
|---|---|---|---|---|
| 2009/0056130 | A1* | 3/2009 | Ross | G01F 15/00 |
| | | | | 29/890.09 |
| 2011/0226053 | A1* | 9/2011 | Sorenson | G01F 15/125 |
| | | | | 73/204.23 |
| 2013/0060491 | A1* | 3/2013 | Valenzano | G01F 1/696 |
| | | | | 702/45 |
| 2013/0060492 | A1* | 3/2013 | Stabile, Jr. | G01F 1/696 |
| | | | | 702/45 |
| 2014/0182692 | A1* | 7/2014 | Hirata | G01F 1/50 |
| | | | | 137/486 |
| 2016/0161311 | A1* | 6/2016 | Olin | G01F 1/6847 |
| | | | | 73/861.95 |
| 2016/0161314 | A1 | 6/2016 | Hunziker et al. | |
| 2017/0016752 | A1* | 1/2017 | Speldrich | G01F 5/005 |
| 2021/0116278 | A1* | 4/2021 | De Luca | G01F 1/6842 |

FOREIGN PATENT DOCUMENTS

| | | |
|---|---|---|
| JP | 2005-315788 A | 11/2005 |
| KR | 30-0940-1590000 | 1/2018 |

OTHER PUBLICATIONS

Extended European Search Report Mailed on Jul. 10, 2024 for EP Application No. 24155254, 9 page(s).
English Translation of JP Office Action dated Jan. 30, 2025 for JP Application No. 2024017392, 4 page(s).
JP Office Action Mailed on Jan. 30, 2025 for JP Application No. 2024017392, 4 page(s).
English Translation of JP Office Action dated Jul. 10, 2025 for JP Application No. 2024017392, 3 page(s).
JP Office Action Mailed on Jul. 10, 2025 for JP Application No. 2024017392, 3 page(s).

\* cited by examiner

FLOW SENSING APPARATUS

FIELD OF THE INVENTION

Exemplary embodiments of the present disclosure relate generally to a flow sensing apparatus, and more particularly, to methods, apparatuses, and systems for measuring a flow rate of a flowing media.

BACKGROUND

Flow sensors may be used to measure a flow rate and/or quantity of a flowing media (e.g., moving liquid or gaseous substance) and may be implemented in various applications. Such flow sensing apparatuses are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for improving sensitivity and performance of an apparatus such as, for example, a flow sensing apparatus.

In accordance with various examples of the present disclosure, a flow sensing apparatus is provided. The flow sensing apparatus may comprise: a housing defining an inlet port and an outlet port; a sensing element disposed at least partially within the housing; a main flow path defined within the housing connecting the inlet port and the outlet port, where the main flow path is disposed proximate the sensing element such that at least a portion of the flowing media is in fluid contact with the sensing element; and a laminarizing structure located in the inlet port and configured to direct a flowing media in a laminar flow pattern.

In some embodiments, the sensing element is electrically connected with a printed circuit board assembly (PCBA).

In some embodiments, the PCBA and the sensing element are connected via wire bonds, and the wire bonds are covered in an encapsulant material.

In some embodiments, the main flow path has a tapering cross-section from a position connecting with the inlet port to a position contacting the sensing element.

In some embodiments, an additional laminarizing structure is located in an outlet port and configured to direct the flowing media in the laminar flow pattern.

In some embodiments, the flow sensing apparatus further include a bypass flow path defined within the housing connecting the inlet port and the outlet port.

In some embodiments, the housing further includes a first portion and a second portion, wherein the first portion and the second portion define the main flow path, and the inlet port and the outlet port are defined by the first portion.

In some embodiments, the laminarizing structure further includes a plurality of fins extending between the inlet port and the main flow path to direct the flowing media in the laminar flow pattern.

In some embodiments, each of the plurality of fins has a core-out structure.

In some embodiments, the plurality of fins are equally spaced around the inlet port.

In some embodiments, an extending direction of the plurality of fins is angled 90° to the main flow path.

In some embodiments, the laminarizing structure further includes a controller component, configured to receive a flow rate indication from the sensing element that is in electronic communication with the controller component.

In some example embodiments, a flow sensing system is provided. The flow sensing system may comprise: a housing defining an inlet port and an outlet port; a sensing element disposed at least partially within the housing; a main flow path defined within the housing connecting the inlet port and the outlet port, where the main flow path is disposed proximate the sensing element such that at least a portion of the flowing media is in fluid contact with the sensing element; and the main flow path has a tapering cross-section from a position connecting with the inlet port to a position contacting the sensing element.

In some embodiments, the tapering cross-section takes a form of a rectangular shape, and a wall angle of an external wall of the main flow path decreases from the position connecting with the inlet port to the position contacting the sensing element.

In some embodiments, an area of the tapering cross section of main flow path decreases from the position connecting with the inlet port to the position contacting the sensing element.

In some embodiments, the flow sensing system further comprise a laminarizing structure located in the inlet port and configured to direct a flowing media in a laminar flow pattern.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
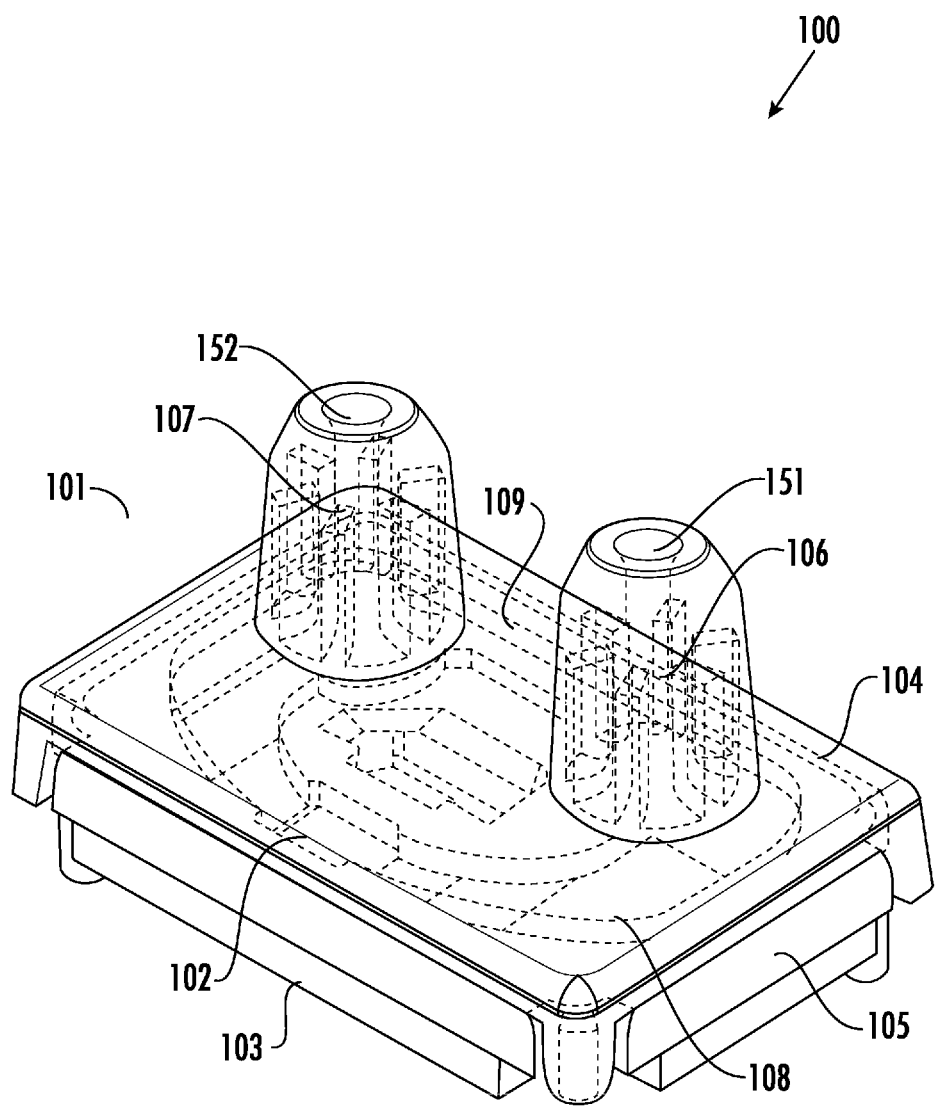
FIG. 1 illustrates a schematic diagram depicting an example flow sensing apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in a dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refers to two or more electrical elements (for example, but not limited to, an example processing circuitry, communication module, input/output module memory, humidity sensing component, cooling element, gas detection component) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "flow sensing apparatus" may refer to an apparatus that may detect, measure, and/or identify flow rate(s) (including, but not limited to, linear flow velocity, nonlinear flow velocity, mass flow rate, and/or volumetric flow rate) of a flowing media or medium. In the present disclosure, the term "flowing media" refers to a substance (such as, but not limited to, a liquid substance and/or a gaseous substance, such as air).

The term "flow path" may refer to a passageway through which a flowing media may flow, traverse or be conveyed. As will be described in detail further herein, an example flow path of the present disclosure may be defined/formed by and/or include a plurality of channels. In various examples of the present disclosure, example dimensions of example cross sections of example flow channels may be in the microns to hundreds of microns in height and tens of microns to hundreds of microns in width. For example, a height of the example cross sections of example flow channels may be in a range from 100 microns to 800 microns, preferably in a range from 230 microns to 300 microns. For example, a width of the example cross sections of example flow channels may be in a range from 50 microns to 2000 microns, preferably in a range from 700 microns to 1400 microns. In various examples of the present disclosure, example flow channels may be greater than one hundred microns in length.

The term "laminar flow" may be characterized by particles of a flowing media following smooth path(s) in the flow channel with little or no mixing (i.e., high momentum diffusion and low momentum convection). In contrast, the term "turbulent flow" may be characterized by particles of the flowing media undergoing irregular fluctuations, or mixing. The term "flow eddies" may be characterized by a fluid and the reverse current created when the fluid is in a turbulent flow regime.

Flow sensing apparatuses may be utilized in a variety of applications including medical and industrial applications. For example, flow sensing apparatuses may be utilized in micro-pipetting, high-performance liquid chromatography (HPLC) applications, drug delivery, respirators, ventilators, Anesthesia machines, heating, ventilation, and air conditioning (HVAC) equipment, gas analyzers, leak detection equipment, and/or the like. For example, a flow sensing apparatus may be implemented in a drug delivery system to detect, measure, and/or identify a flow rate of a flowing media associated therewith.

In some examples, flow sensing apparatuses may include a bypass path which diverges from a main flow path and/or main flow channel, wherein a portion of a flowing media flows into the bypass path and/or bypass channel. In such examples, a flow rate of the flowing media may be determined based on the determined flow rate of the portion of the flowing media flowing through the main flow path. Flow-sensing applications may include, but are not limited to, industrial, commercial, medical, and automotive industries. For example, a flow sensing apparatus may be used in a medical application to monitor and/or control a patient's breathing.

In particular and in some examples, ultra small flow sensing apparatuses are relied upon to reduce size and weight of medical ventilators (e.g., machines of continuous positive airway pressure (CPAP) or variable positive airway pressure (VPAP)). In some examples, the ultra-small flow sensing apparatuses may be in dimension of 8 mm*5 mm. However, reducing the size of a flow sensing apparatus may, in some examples, cause the flow sensing apparatuses to be susceptible to mismeasurement due to flow eddies and/or turbulent flow effects (e.g., non-uniformity in flow velocity and pressure because of shorter flow paths) in a main or primary flow channel, and thus the accuracy of such sensors may be adversely affected by such factors. Additionally or alternatively, performance of an example flow sensing apparatus may be negatively impacted, in some examples, by poor linearity, pressure changes, flow eddies and/or turbulent flow of a flowing media, low sensitivity, and/or mass noise attributable to their complex guide structures.

Using the systems, apparatuses and techniques disclosed herein, example flow sensing apparatuses configured for use in both low flow applications, high flow applications, and combinations thereof are provided. The example flow sensing apparatuses, in some embodiments, are capable of measuring flow rates of ultra small flow sensing apparatuses with increased accuracy. In some embodiments, an example flow sensing apparatus may be configured to have a spline-shaped flow path (e.g., a main flow path and a bypass path) to increase accuracy of measuring the flow rate of the flowing media.

As such, some examples of the present disclosure may improve performance, sensitivity, accuracy, and/or reduce noise of a flow sensing apparatus, and/or may, in some examples, enable measurement of a flow rate in a micro flow sensing apparatus. In another example, the techniques and apparatuses described herein may be used in high-flow and low-pressure-drop applications, e.g., in conjunction with a respirator and will exhibit improved performance in comparison with conventional apparatuses.

To address challenges and limitations associated with measuring flow rates, various examples of the present disclosure may be provided. For example, various examples of the present disclosure may provide example flow sensing apparatuses, methods, computer program products, and systems.

Referring now to FIG. 1, a schematic diagram depicting a perspective view of an example flow sensing apparatus 100 in accordance with various embodiments of the present disclosure is provided. As depicted in FIG. 1, the flow sensing apparatus 100 includes a housing 101, a sensing element 102, and a main flow path 108 defined by the housing 101.

As illustrated in FIG. 1, the example housing 101 of the flow sensing apparatus may be or include plastic, biodegradable materials, poly(methyl methacrylate) (PMMA), cyclic olefine copolymers, polycarbonate, polystyrene, polyether ether ketone (PEEK), polytetrafluoroethylene (PTFE), liquid-crystal polymers (LCPs), polyetherimide (PEI), epoxy, PerFluoroAlkoxy (PFA), fluorinated ethylene propylene (FEP), combinations thereof, and/or the like.

In various embodiments, the housing 101 of the example flow sensing apparatus 100 includes an inlet port 106 and an outlet port 107, and is configured to convey a flowing media along a flow channel that fluidly connects the inlet port 106 and the outlet port 107. In some embodiments, the inlet port 106 may include an orifice 151 and the outlet port 107 may include an orifice 152 to create a pressure drop for the flowing media.

In some embodiments, as depicted, the flow channel may include a main flow path 108 defined within the housing 101 of the flow sensing apparatus 100. For example, the main flow path 108 includes at least one internal channel that fluidly connects the inlet port 106 and the outlet port 107 such that a flowing media within the flow sensing apparatus 100 flows through main flow path 108. Accordingly, one or more measurements (e.g., a flow rate) associated with the flowing media may be obtained by measuring at least one portion of the flowing media within the main flow path 108. In such examples, a flow rate of a flowing media may be measured or otherwise determined based at least in part on the flow rate of the portion of the flowing media flowing through the main flow path 108. As further illustrated, the main flow path 108 is at least partially positioned proximate the sensing element 102.

In various examples, the inlet port 106 and the outlet port 107 may be connected with external pipes to convey the flowing media. For example, the inlet port 106 may be connected with an incoming pipe to allow the flowing media to flow into the flow sensing apparatus 100. For example, the outlet port 107 may be connected with an outgoing pipe to allow the flowing media to flow out of the flow sensing apparatus 100.

In various examples, the sensing element 102 (e.g., flow sensing element, sensing die, transducer and/or the like) is configured to detect/measure a flow rate of a flowing media through the main flow path 108. In some embodiments, the sensing element 102 may be electrically connected with and in communication with a controller component 103, such as a printed circuit board assembly (PCBA) or an analog-to-digital converter to communicate with of the sensing element 102. The example PCBA may be or include epoxy, ceramic, alumina, LCPs, combinations thereof, and/or the like. For example, wire bonds, bump bonds or the like may be utilized to electrically connect the example sensing element 102 to the PCBA. The example PCBA may include a thick film printed ceramic board, a laminate and/or other material. Additionally and/or alternatively, the example PCBA may include one or more conductive pads for engaging circuitry and/or electronic components in communication with a remote processor or the like.

In some embodiments, the flow channel may further include a bypass flow path 109 defined within the housing 101 of the flow sensing apparatus 100. As illustrated in FIG. 1, the bypass flow path 109 may comprise at least one internal channel that fluidly connects the inlet port 106 and the outlet port 107 such that at least a portion of the flowing media within the flow sensing apparatus 100 flows through the bypass flow path 109. As further illustrated, the bypass flow path 109 and the main flow path 108 may be defined and positioned in a spaced apart or spline-shaped configuration, may be proximate one another, and/or may be on opposite sides of the housing 101. As such, and in operation in some examples, portion of the flowing media within the flow sensing apparatus 100 flows through the main flow path 108 and the bypass flow path 109.

In various examples, a typical flow rate of breathing of an adult is approximately 60 Liters per minute and, in some examples, such a high flow rate may increase flow eddies and/or the turbulence in the flow channel. As a result, the measurement accuracy of a flow rate of the flowing media will be reduced. In order to address accuracy and in various embodiments, the bypass flow path 109 may be configured to divert or otherwise cause a portion of the flowing media to flow through the bypass flow path, such that only a sample of flow media is directly to the sensing element and the flow rate of the flowing media in the main flow path is reduced. For example, the bypass flow path 109 may be configured to have at least 20%, preferably at least 35% and more preferably at least 50% of the flowing media to flow through the bypass flow path. The flow rate of the flowing media through the flow sensing apparatus 100 may be calculated based on the flow rate of the flowing media in the main flow path 108. Alternatively or additionally, the flow rate of the flowing media through the flow sensing apparatus 100 may be calculated based on the flow rate of the flowing media in the main flow path bypass flow path 109.

While the description above provides an example flow sensing apparatus 100, it is noted that the scope of the present disclosure is not limited to the description above. In some examples, an example flow sensing apparatus 100 may in accordance with the present disclosure may be in other forms. In some examples, an example flow sensing apparatus 100 may include one or more additional and/or alternative elements, and/or may be structured/positioned differently than that illustrated in FIG. 1.

Figure 2:
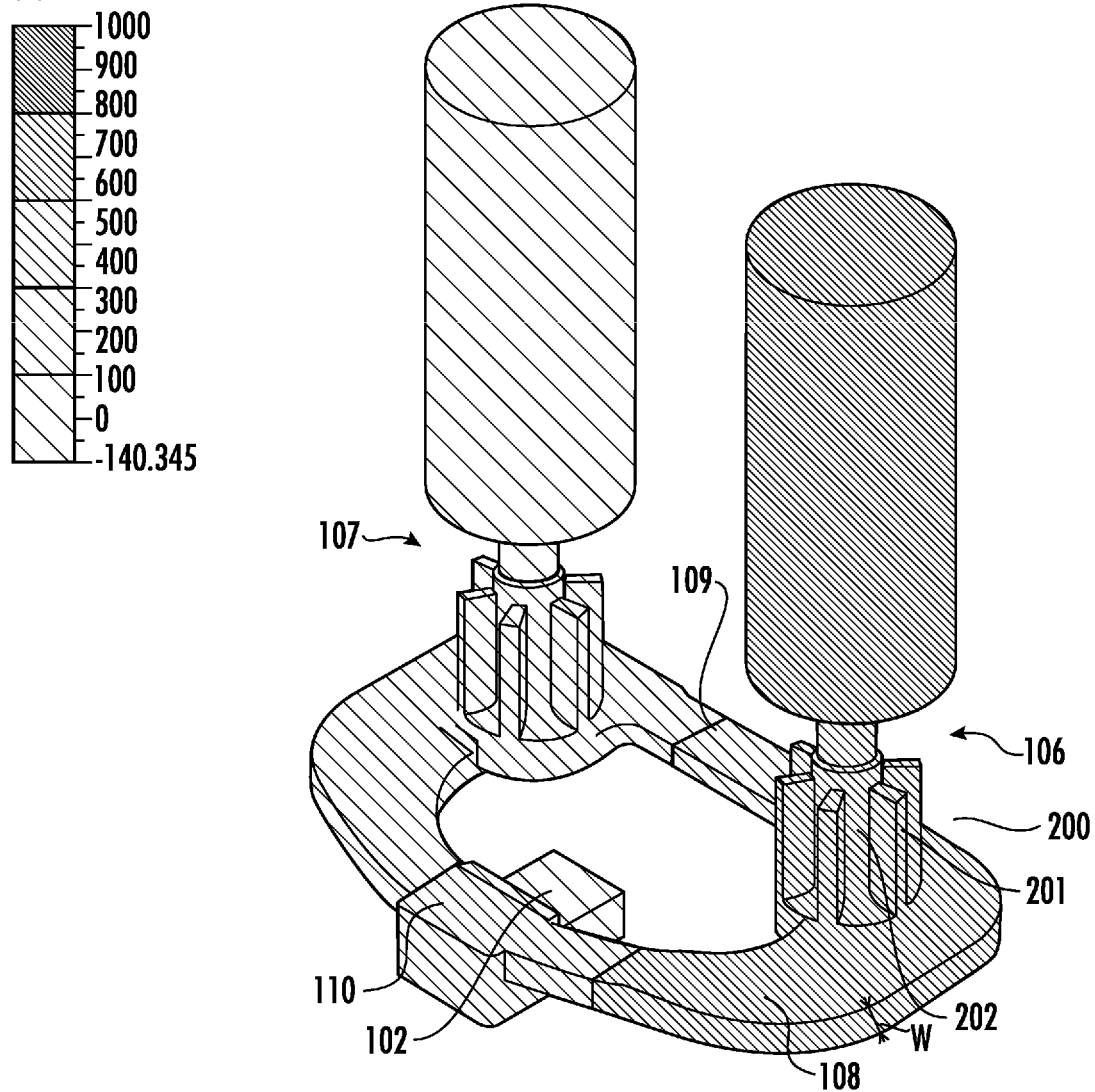
FIG. 2 illustrates a schematic diagram depicting a perspective view of a pressure distribution of a flowing media within a flow sensing apparatus in accordance with various embodiments of the present disclosure.

Referring now to FIG. 2, a schematic diagram depicting a perspective view of the flow sensing apparatus 100 with overlaid pressure distribution measurements of a flowing media within the flow sensing apparatus 100 in accordance with various embodiments of the present disclosure is provided.

As depicted in FIG. 2, pressures of a flowing media within the main flow path 108 and the bypass flow path 109 are represented by different lining patterns. In particular, a pattern with more linings represents a higher pressure of the flowing media. For example, a pressure of the flowing media at the inlet port is represented by a pattern with more linings and a pressure of the flowing media at the outlet port is represented by a pattern with less linings. The pattern with more linings represents a higher pressure than the pattern with less linings. The pressure of the flowing media decreases within the main flow path 108 from the inlet port 106 to the outlet port 107. Similarly, the pressure of the flowing media also decreases within the bypass flow path 109 from the inlet port 106 to the outlet port 107.

As further depicted in FIG. 2, the main flow path 108 may include a channel 110 disposed adjacent the sensing element 102. As shown, at least a surface of the sensing element 102 may form a portion of the main flow path 108 such that at least a portion of the flowing media is in fluid contact with the sensing element 102. In various examples, as depicted in FIG. 2, in order to satisfy various low pressure drop specifications and requirements, the main flow path 108 may have a tapering cross-section from a position connecting with the inlet port 106 to a position contacting the sensing element 102.

In various embodiments, a cross section of the main flow path 108 may take a form a rectangular shape. In some examples, the main flow path 108 may have a uniform width w.

In some embodiments, the main flow path 108 may take the form of a pipe shape. In some embodiments, the sectional shape of the main flow path 108 may be trapezoid, circular, elliptical, or the like. In some embodiments, the sectional shape of the main flow path 108 may include a smooth curve or polyline. In some embodiments, the sectional shape of the bypass flow path 109 may be trapezoid, circular, elliptical, or the like. In some embodiments, the sectional shape of the bypass flow path 109 may include a smooth curve or polyline.

In some embodiments, the bypass flow path 109 may be blocked or omitted from the flow path. For example, the bypass flow path 109 may be blocked by an adhesive material or other interfering material. In some embodiments, the flow sensing apparatus 100 may not include a bypass flow path 109.

As depicted in FIG. 2, a laminarizing structure 200 may be located in the inlet port 106 and outlet port 107, and configured to direct the flowing media to flow in a laminar flow pattern. For example, the laminarizing structure 200 may include a plurality of fins 201 located in the inlet port and is configured to direct the flowing media to flow in the laminar flow pattern. The laminarizing structure 200 may also be located in the outlet port and configured to further direct the flowing media to flow in the laminar flow pattern. For example, the plurality of fins 201 may extend between the inlet port and the main flow path to direct the flowing media in the laminar flow pattern. For example, the plurality of fins 201 may be disposed on a cylindrical wall 202 of the inlet port 106.

Figure 3:
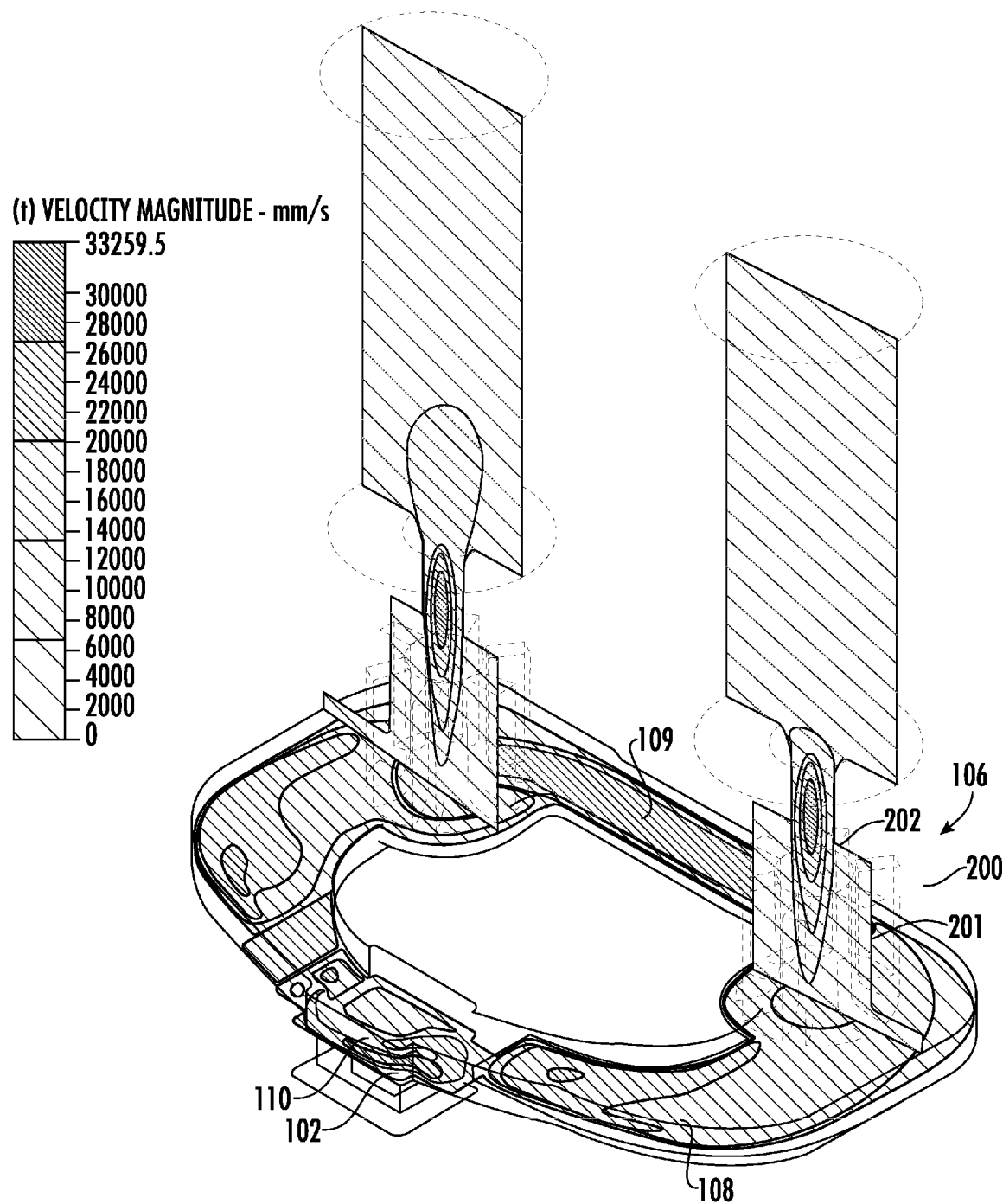
FIG. 3 illustrates a schematic diagram depicting a perspective view of a flow velocity magnitude distribution of a flowing media within the flow sensing apparatus in accordance with various embodiments of the present disclosure.

Referring now to FIG. 3, a schematic diagram depicting a perspective view of the flow sensing apparatus 100 with overlaid flow velocity magnitude distribution measurements of a flowing media within the flow sensing apparatus 100 in accordance with various embodiments of the present disclosure is provided.

As depicted in FIG. 3, a flow velocity magnitude of a flowing media within the main flow path 108 and the bypass flow path 109 is represented by different lining patterns. In particular, a pattern with more linings represents a higher flow velocity of the flowing media. For example, a flow velocity magnitude of the flowing media close to the inlet port is represented by a pattern with more linings and a flow velocity magnitude of the flowing media close to the sensing element 102 is represented by a pattern with less linings. The pattern with more linings represents a large flow velocity than the pattern with less linings. The flow velocity magnitude of the flowing media may increase gradually within the main flow path 108 from the inlet port 106 to the sensing element 102.

FIG. 3, further provides a perspective view of the laminarizing structure 200 of the flow sensing apparatus 100. The laminarizing structure 200 may be located in the inlet port 106 and the outlet port 107, and configured to direct the flowing media to flow in a laminar flow pattern. For example, the plurality of fins 201 of the laminarizing structure 200 may extend between the inlet port 106 and the main flow path 108 to direct the flowing media in a laminar flow pattern. For example, the plurality of fins 201 of the laminarizing structure 200 may extend outwardly and into the main flow path 108 to further direct the flowing media in the laminar flow pattern.

In various embodiments, each of the plurality of fins has a core-out structure. For example, the core-out structure may include empty voids surrounded by walls of the fins. The empty voids, in some examples, reduce a volume of the plastic material of the housing 101 and the housing 101 may be easier to be molded.

In various embodiments, the plurality of fins 201 may be equally spaced radially around the inlet port 106 and the outlet port 107. For example, the plurality of fins 201 may be disposed on the cylindrical wall 202 of the inlet port 106 and thus they extend outwardly into the flow path 108. That is, the flowing media entering the inlet port 106 will encounter the plurality of fins 201 which are in the path of the incoming flowing media and which are planar and disposed in the direction of the fluid flow. For example, the plurality of fins 201 may include at least two fins around the cylindrical wall 202 of the inlet port 106. For example, the plurality of fins 201 may include six fins as shown equally spaced around the cylindrical wall 202 of the inlet port 106, and the flowing media will therefore be directed along an extending direction of the plurality of fins 201, rather than in flow eddies, turbulence, or swirling toward the cylindrical wall 202 of the inlet port 106. The fins serve, in some examples, to calm or otherwise reduce any flow eddies and/or turbulent flow and to create a steady or laminar flow directed in the extending direction of the plurality of fins 201. Similarly, the plurality of fins may also be disposed on a cylindrical wall of the outlet port 107 to further laminarize the flowing media.

In various embodiments, at least one fin of the plurality of fins 201 is positioned such that it extends into the flow path 108 and is perpendicular to the flow path 108. For example, when the flowing media flows from the inlet port 106 to the main flow path 108, the laminarizing structure 200 may assist flow control through a 90° flow bend at the inlet port 106. For example, when the flowing media flows from the main flow path 108 to the outlet port 107, the laminarizing structure 200 may further assist flow control through a 90° flow bend at the outlet port 107.

Figure 4:
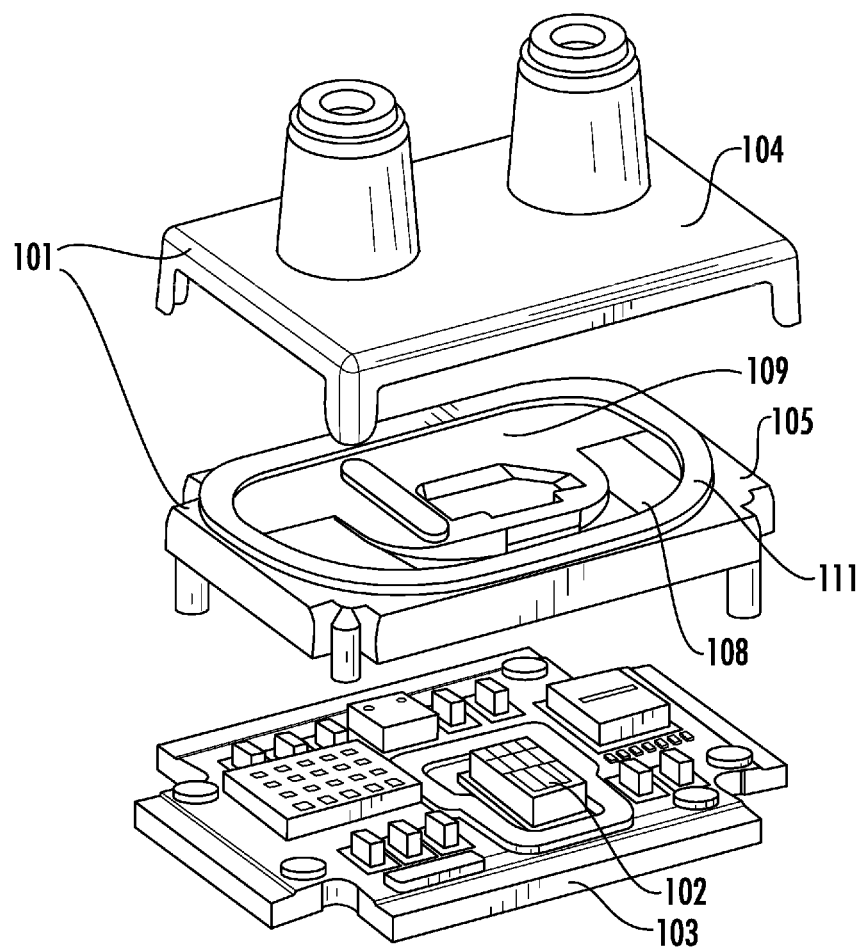
FIG. 4 illustrates a schematic diagram depicting an exploded view of an example flow sensing apparatus in accordance with various embodiments of the present disclosure.

Referring now to FIG. 4, a schematic diagram depicting an exploded view of an example flow sensing apparatus 100 in FIG. 1 is provided. As depicted in FIG. 4, the flow sensing apparatus 100 includes a housing 101, a sensing element 102, and a main flow path 108 defined by the housing 101.

In some embodiments, the housing 101 may include a first portion 104 and a second portion 105. For example, the first portion 104 and the second portion 105 may be glued to each other by an adhesive layer 111 to define the main flow path 108 and the bypass flow path 109. As further illustrated, the main flow path 108 is at least partially positioned proximate the sensing element 102, such that a flow rate of a flowing media in the main flow path may be measured by the sensing element 102. In some embodiments, the sensing element 102 may be electrically connected and configured to communicate with a PCBA.

Figure 5:
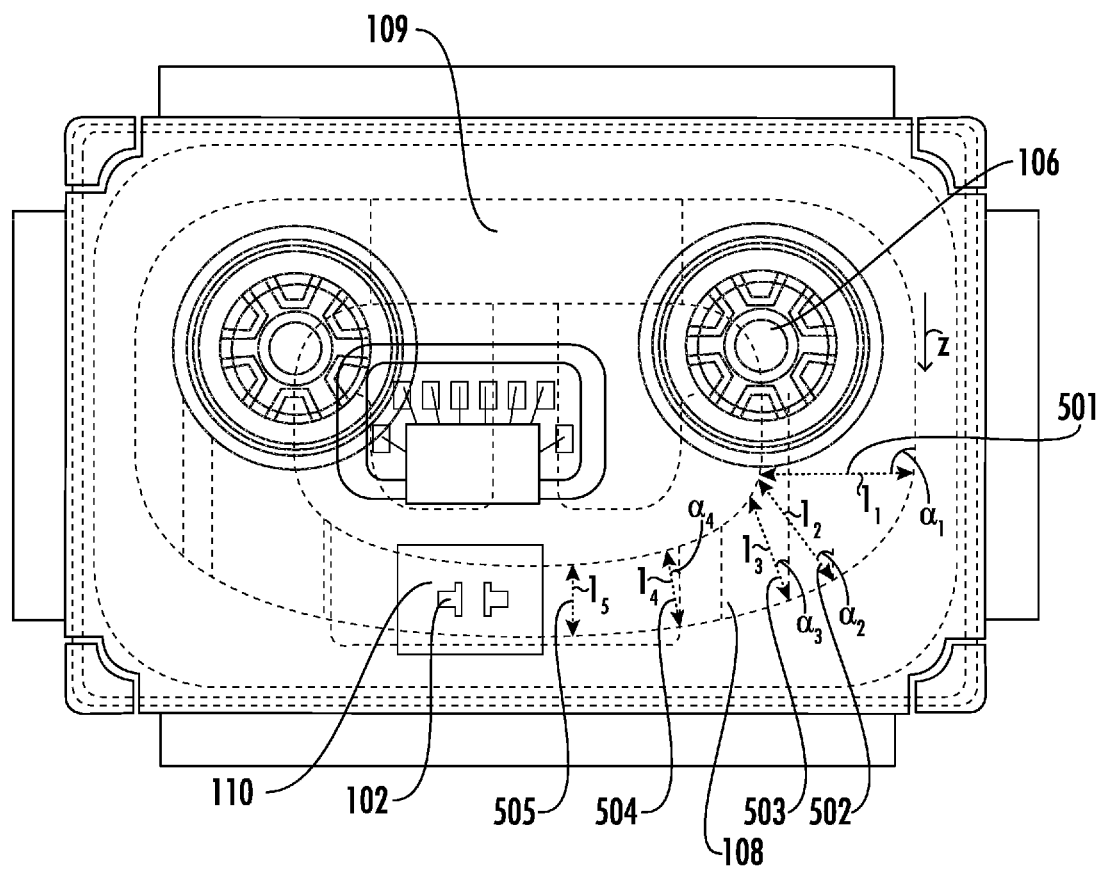
FIG. 5 illustrates a schematic diagram depicting a top view of an example flow sensing apparatus in accordance with various embodiments of the present disclosure.

Referring now to FIG. 5, a schematic diagram depicting a top view of an example flow sensing apparatus 100 of FIG. 1 is provided. As depicted in FIG. 5, the main flow path 108 and the bypass flow path 109 are defined by the housing 101 and located on two sides of the housing 101 of the flow sensing apparatus 100.

As further depicted in FIG. 5, the main flow path 108 may include a channel 110 disposed adjacent the sensing element 102. As shown, at least a surface of the sensing element 102 may form a portion of the main flow path 108 such that at least a portion of the flowing media is in fluid contact with the sensing element 102. For example, a cross section of the main flow path 108 may be located in a plane perpendicular to an outside wall 510 of the main flow path 108.

In various examples, as depicted in FIG. 5, in order to satisfy various low pressure drop specifications and requirements, the main flow path 108 may have a tapering cross-section from a position connecting with the inlet port 106 to a position contacting the sensing element 102. For example, an area of a cross-section of the main flow path 108 at position 501 is larger than an area of a cross-section of the main flow path 108 at position 502, where the position 502 is further away from the inlet port 106 than the position 501 along the direction of the flowing media in the main flow path 108. For example, the area of the cross-section of the main flow path 108 at position 502 is larger than an area of a cross-section of the main flow path 108 at position 503, where the position 503 is further away from the inlet port 106 than the position 502 along the direction of the flowing media in the main flow path 108. For example, the area of the cross-section of the main flow path 108 at position 503 is larger than an area of a cross-section of the main flow path 108 at position 504, where the position 504 is further away from the inlet port 106 than the position 503 along the direction of the flowing media in the main flow path 108. For example, the area of the cross-section of the main flow path 108 at position 504 is larger than an area of a cross-section of the main flow path 108 at position 505, where the position 505 is further away from the inlet port 106 than the position 503 along the direction of the flowing media in the main flow path 108. For example, an area of a cross-section of the main flow path 108 may decrease gradually from a starting position of the main flow path 108 to a position of the main flow path in contact with the sensing element 102.

In various examples, as depicted in FIG. 5, the outside wall 510 of the main flow path 108 is the main guide for the flowing media after the 90° flow bend of the flowing media at the inlet port 106. A wall angle α is formed between a flow direction z of the flowing media after the 90° flow bend and a vertical line of the outside wall 510. In some examples, the wall angle α may decrease gradually from 90° at the 90° flow bend to 0° C. lose to the sensing element 102, such that the flowing media can be guided to the sensing element 102. For example, at position 501, the wall angle $\alpha_1$ is 90°. For example, at position 502, the wall angle $\alpha_2$ is 30°. For example, at position 503, the wall angle $\alpha_3$ is 20°. For example, at position 504, the wall angle $\alpha_4$ is 10°. For example, at position 505, the wall angle is 0°.

In various examples, a cross section of the main flow path 108 may take a form a rectangular shape. In some examples, a rectangular shape of the cross section of the main flow path 108 may have a width w and a channel length l. In some examples, the width w of the main flow path does not change and the channel length l of the flow path decreases from the 90° flow bend to the sensing element 102. For example, the channel length of the flow path is $l_1$ at position 501, the channel length of the flow path is $l_2$, at position 502, the channel length of the flow path is $l_3$ at position 503, the channel length of the flow path is $l_4$, at position 504, and the channel length of the flow path is $l_5$ at position 505. For example, at position 502, the wall angle $\alpha_2$ is 30°. For example, at position 503, the wall angle $\alpha_3$ is 20°. For example, at position 504, the wall angle $\alpha_4$ is 10°. For example, at position 505, the wall angle is 0°, where $l_1>l_2>l_3>l_4>l_5$.

In various examples, a Reynold's number Re may be calculated based on the geometry of the flow path 108 and a velocity of the flowing media as shown in following table (T.1).

TABLE 1

Channel Dimensions-Typical

| Angle [1] (α) | Length (l) | Width | Area | Dh [2] | Velocity Avg | Re |
|---|---|---|---|---|---|---|
| Sense Die (α:= 0) | 0.70 | 0.30 | 0.21 | 0.42 | 3968 | 111 |
| 0 | 0.70 | 0.30 | 0.21 | 0.42 | 3968 | 111 |
| 2 | 0.71 | 0.30 | 0.21 | 0.42 | 3890 | 109 |
| 10 | 0.83 | 0.30 | 0.25 | 0.44 | 3335 | 98 |
| 20 | 1.13 | 0.30 | 0.34 | 0.47 | 2463 | 77 |
| 30 | 1.47 | 0.30 | 0.44 | 0.50 | 1890 | 62 |
| 45 | 1.40 | 0.30 | 0.42 | 0.49 | 1991 | 65 |
| 60 | 1.41 | 0.30 | 0.42 | 0.49 | 1970 | 65 |
| 90 | 1.40 | 0.30 | 0.42 | 0.49 | 1984 | 65 |

[1] Angle is referenced to angle of outsoide wall at the sense die.
[2] Dh = Hydraulic Diameter = 4XArea/P
For very narrow channel, Dh = 2Xh As depicted in T.1, the Reynold number R of the main flow path 108 remains to be stable and in a low range when the wall angle changes from 90° to 30°. For example, Re is approximately 65 when the wall angle changes from 90° to 30°. The velocity of the flowing media remains in a low speed range (for example, the velocity of the flowing media is approximately 1950), such that the turbulence may be reduced as the flowing media changes direction through the main flow path 108.

Furthermore, the Reynold number Re of the main flow path 108 increases as the wall angle further decreases to be below 30°. The velocity of the flowing media may increase comparing with the low speed range.

In various examples, a Reynold's number Re of the main flow path 108 may decrease as the wall angle α of the outside wall 510 increases. For example, the Reynold's number Re is higher for flow farther from the 90° flow bend. In some examples, the channel length of the flow path and the area of the cross-section of the main flow path 108 decreases farther from the 90° flow bend.

While the description above of T.1 provides an example flow channel, it is noted that the scope of the present disclosure is not limited to the description above. In some examples, the Reynold's number of the example flow channel may change in other trends in accordance with the present disclosure. In some examples, the Reynold's number Re may be substantially the same for flow farther from the 90° flow bend. In some examples, the Reynold's number Re may be lower for flow farther from the 90° flow bend.

Figure 6:
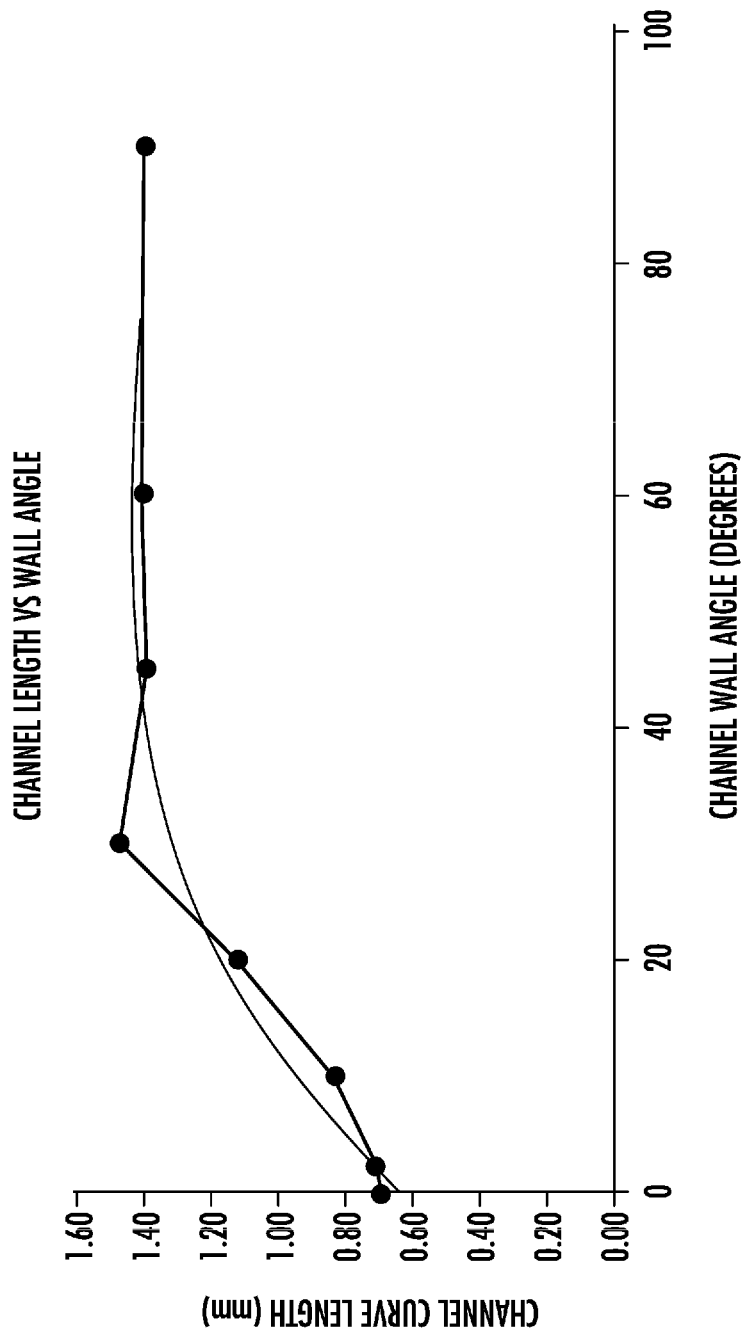
FIG. 6 illustrates a schematic diagram depicting an exemplary curve of the channel length vs the wall angle in accordance with various embodiments of the present disclosure.

Referring now to FIG. 6, a schematic diagram depicting an exemplary curve of the channel length vs the wall angle in accordance with various embodiments of the present disclosure is provided. A fitting smooth curve is also plotted according to the measurements of the channel lengths and the corresponding wall angles. As depicted in FIG. 6, the channel length decreases as the wall angle decreases.

Figure 7:
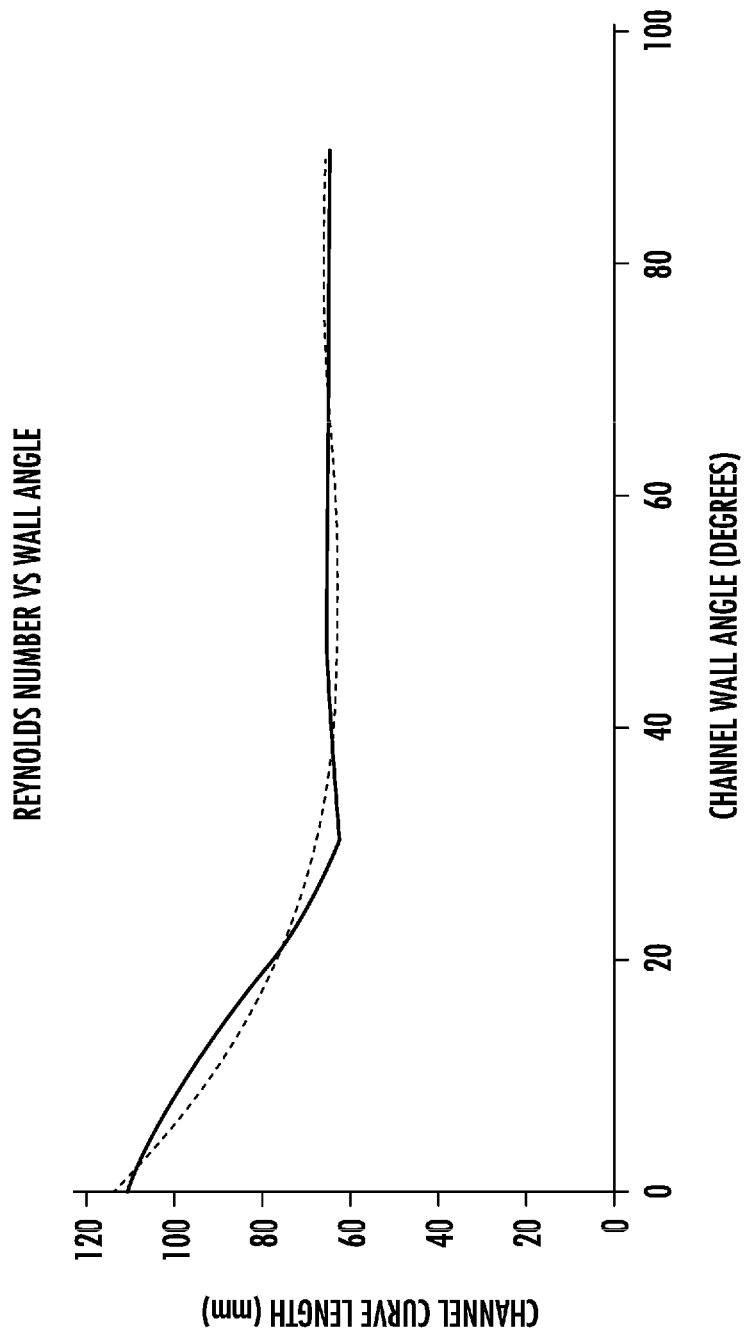
FIG. 7 illustrates a schematic diagram depicting an exemplary curve of the Reynold's number vs the channel length in accordance with various embodiments of the present disclosure.

Referring now to FIG. 7, a schematic diagram depicting an exemplary curve of the Reynold's number vs the channel length in accordance with various embodiments of the present disclosure is provided. A fitting smooth curve is also plotted according to the calculated Reynold's numbers and the corresponding wall angles. In some examples, a flow path with low Reynold's numbers may help stabilize flow of the flowing media. As depicted in FIG. 7, the Reynold's number Re is kept well below 150 through the main flow path 108. For example, the flow of the flowing media is still laminar after the 90° flow bend. In view of the disclosures herein and in some examples, lower Re number may help reduce turbulence and maintain control of flow through the 90° bend in direction, and the improved control may lead to an improved signal with lower noise and improved repeatability of the measurement.

Figure 8:
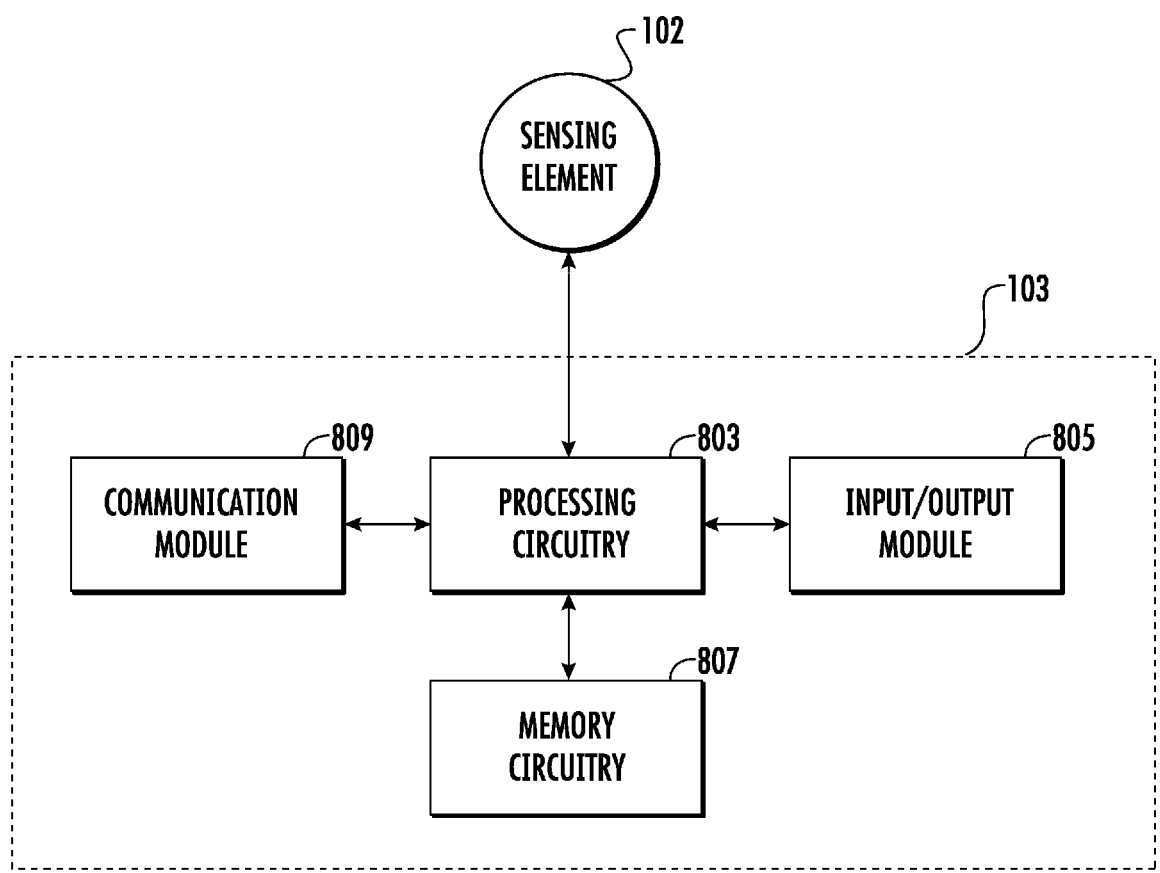
FIG. 8 illustrates a schematic diagram depicting an example controller component in accordance with various embodiments of the present disclosure.

Referring now to FIG. 8, an example schematic diagram depicting an example controller component 103 of an example apparatus in accordance with various embodiments of the present disclosure is provided. In particular, the example controller component 103 includes processing circuitry 803, input/output module 805, memory circuitry 807, and communication module 809. Additionally or alternatively, the controller component 103 is electrically coupled to and/or in electronic communication with a flow sensing apparatus (e.g., such as, but not limited to, flow sensing apparatus 100 described above in connection with FIG. 1). In various embodiments, at least one sensing element 102 of the flow sensing apparatus, the processing circuitry 803, input/output module 805, the memory circuitry 807, and the communication module 809 may be electronically coupled so that they may transmit and/or exchange information and data via wired or wireless connections between and among one another.

The sensing element 102 may be or include an apparatus/device that measures or detects a property associated with the location or environment surrounding the flow sensing element (e.g., a flowing media in a bypass component of an example flow sensing apparatus), and may further indicate, record, and/or output the record of the property. For example, the sensing element 102 may include a transducer, for detecting and/or measuring an air flow rate that may be caused by, for example, the heat transfer. In some embodiments, the sensing element 102 may include a micro-electro-mechanical system (MEMS) flow sensing die. The MEMS flow sensing die may include miniaturized mechanical and electro-mechanical components for detecting and/or measuring air flow, and these components may be fabricated (such as through a microfabrication process) to form a functional circuit on a block of semiconducting material (such as a die). The sensing element 102 may be configured to transmit a first control signal indicative of a flow rate of a gaseous substance such as gaseous substance or a liquid within a bypass component of the flow sensing apparatus.

As used herein, the term "processing circuitry" refers to a circuitry or circuitries that may be configured to perform processing functions and/or software instructions on one or more input signals to generate one or more output signals. In various embodiments of the present disclosure, the processing circuitry 803 may perform processing functions and/or software instructions on signals that are received from the sensing element 102 to, for example, calculate the thermal conductivity of a gaseous substance.

In some embodiments, the processing circuitry 803 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 803 may include one or more processors. In one exemplary embodiment, the processing circuitry 803 is configured to execute instructions stored in the memory circuitry 807 or otherwise accessible by the processing circuitry 803. When executed by the processing circuitry 803, these instructions may enable the controller component 103 to execute one or a plurality of the functions as described herein. No matter whether it is configured by hardware, firmware/software methods, or a combination thereof, the processing circuitry 803 may include entities capable of executing operations according to the embodiments of the present invention when correspondingly configured. Therefore, for example, when the processing circuitry 803 is implemented as an ASIC, an FPGA, or the like, the processing circuitry 803 may include specially configured hardware for implementing one or a plurality of operations described herein. In these examples, the ASIC is an integrated circuit that may be customized for processing signals. In some examples, the ASIC may be fully customized or semi-customized for the particular application of processing signals. In some examples, the ASIC may be a programmable ASIC that allows circuit reconfiguration. In some embodiments, other suitable forms of the processing circuitry 803 may be implemented. Alternatively, as another example, when the processing circuitry 803 is implemented as an actuator of instructions (such as those that may be stored in the memory circuitry 807), the instructions may specifically configure the processing circuitry 803 to execute one or a plurality of algorithms and operations described herein, such as those discussed with reference to FIG. 8.

Referring back to FIG. 8, the processing circuitry 803 may be electronically coupled to the input/output module 805, memory circuitry 807 and/or the communication module 809.

The memory circuitry 807 may be non-transitory and may include, for example, one or more volatile and/or non-volatile memories. The memory circuitry 807 may be configured to store information and data (such as processing functions and/or software instructions). The memory circuitry 807, together with the processing circuitry 803, may cause the controller component 103 to perform various processing functions and/or software instructions in accordance with example embodiments of the present disclosure, including, for example, determining a flow rate of a flowing media through a flow sensing apparatus. In some embodiments, the memory circuitry 807 may include, for example, a volatile memory, a non-volatile memory, or a certain combination thereof. Although illustrated as a single memory in FIG. 8, the memory circuitry 807 may include a plurality of memory components. In various embodiments, the memory circuitry 807 may include, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory circuitry 807 may be configured to store information, data, application programs, instructions, and etc., so that the controller component 103 can execute various functions according to the embodiments of the present disclosure. For example, in at least some embodiments, the memory circuitry 807 is configured to cache input data for processing by the processing circuitry 803. Additionally or alternatively, in at least some embodiments, the memory circuitry 807 is configured to store program instructions for execution by the processing circuitry 803. The memory circuitry 807 may store information in the form of static and/or dynamic information. When the functions are executed, the stored information may be stored and/or used by the controller component 103.

The communication module 809 may include, for example, a device or circuitry embodied in either hardware or a combination of hardware and software that is configured to receive and/or transmit data from/to a network and/or any other device, circuitry, or module in communication with the controller component 103 and/or the sensing element 102. In this regard, the communication module 809 may include, for example, a network interface for enabling communications with a wired or wireless communication network. In some embodiments, the communication module 809 may be implemented as any apparatus included in a circuit, hardware, a computer program product, or a combination thereof, which is configured to receive and/or transmit data from/to another component or apparatus. The computer program product includes computer-readable program instructions stored on a computer-readable medium (for example, the memory circuitry 807) and executed by a controller component 103 (for example, the processing circuitry 803). In some embodiments, the communication module 809 (as with other components discussed herein) may be at least partially implemented as the processing circuitry 803 or otherwise controlled by the processing circuitry 803. In this regard, the communication module 809 may communicate with the processing circuitry 803, for example, through a bus. The communication module 809 may include, for example, antennas, transmitters, receivers, transceivers, network interface cards and/or supporting hardware and/or firmware/software, and is used for establishing communication with another apparatus. The communication module 809 may be configured to receive and/or transmit any data that may be stored by the memory circuitry 807 by using any protocol that can be used for communication between apparatuses. The communication module 809 may additionally or alternatively communicate with the input/output module 805, memory circuitry 807, and/or any other component of the controller component 103, for example, through a bus.

In some embodiments, the controller component 103 may include an input/output module 805. The input/output module 805 may communicate with the processing circuitry 803 to receive instructions input by the user and/or to provide audible, visual, mechanical, or other outputs to the user. Therefore, the input/output module 805 may include supporting devices, such as a keyboard, a mouse, a display, a touch screen display, and/or other input/output mechanisms. Alternatively, at least some aspects of the input/output module 805 may be implemented on a device used by the user to communicate with the controller component 103. The input/output module 805 may communicate with the memory circuitry 807, the communication module 809 and/or any other component, for example, through a bus. One or a plurality of input/output modules and/or other components may be included in the controller component 103.

In some examples, the sensing element 102 may generate a flow rate indication and transmit the flow rate indication to the processing circuitry 803. Accordingly, the sensing element 102 and the controller component 103 may operate to generate measurements indicating a flow rate associated with a flowing media in a flow channel of an apparatus.

In FIG. 8, although components 102, 803, 805, 807, and 809 may be described with respect to functional limitations, it is contemplated that the particular implementations necessarily include the use of particular hardware. It is also contemplated that certain of these components 102, 803, 805, 807, and 809 may additionally or alternatively include one or more similar or common hardware. For example, the sensing element 102 may additionally or alternatively include a processing circuitry, such that the sensing element 102 may detect and process various signals. In various examples, the controller component 103 may operate to generate measurements indicating a flow rate of a flowing media within the sensing element 102.

While the description above provides an example controller component 103, it is noted that the scope of the present disclosure is not limited to the description above. In some examples, an example controller component may include one or more additional and/or alternative elements, and/or may be structured/positioned differently than that illustrated in FIG. 8.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A flow sensing apparatus, comprising:
    a housing defining an inlet port and an outlet port;
    a sensing element disposed at least partially within the housing;
    a main flow path defined within the housing connecting the inlet port and the outlet port, wherein the main flow path is disposed proximate the sensing element such that at least a portion of a flowing media is in fluid contact with the sensing element; and
    a laminarizing structure located in the inlet port and configured to direct the flowing media in a laminar flow pattern, wherein the laminarizing structure comprises a plurality of fins around the inlet port and the outlet port, the fins around the inlet port extending between the inlet port and the main flow path to direct the flowing media in the laminar flow pattern.

2. The flow sensing apparatus of claim 1, wherein the sensing element is electrically connected with a printed circuit board assembly (PCBA).

3. The flow sensing apparatus of claim 2, wherein the PCBA and the sensing element are connected via wire bonds, and the wire bonds are covered in an encapsulant material.

4. The flow sensing apparatus of claim 1, wherein the main flow path has a tapering cross-section from a position connecting with the inlet port to a position contacting the sensing element.

5. The flow sensing apparatus of claim 1, wherein an additional laminarizing structure is located in the outlet port and configured to direct the flowing media in the laminar flow pattern.

6. The flow sensing apparatus of claim 1, further comprising:
    a bypass flow path defined within the housing connecting the inlet port and the outlet port.

7. The flow sensing apparatus of claim 1, wherein:
    the housing further includes a first portion and a second portion, wherein the first portion and the second portion define the main flow path, and
    the inlet port and the outlet port are defined by the first portion.

8. The flow sensing apparatus of claim 1, wherein each of the plurality of fins has a core-out structure.

9. The flow sensing apparatus of claim 1, wherein the plurality of fins are equally spaced around the inlet port.

10. The flow sensing apparatus of claim 1, wherein:
    an extending direction of the plurality of fins is angled 90° to the main flow path.

11. The flow sensing apparatus of claim 1, further comprising a controller component, configured to receive a flow rate indication from the sensing element that is in electronic communication with the controller component.

12. A flow sensing system, comprising:
    a housing defining an inlet port and an outlet port;
    a sensing element disposed at least partially within the housing;
    a main flow path defined within the housing connecting the inlet port and the outlet port, wherein the main flow path is disposed proximate the sensing element such that at least a portion of a flowing media is in fluid contact with the sensing element; and
    the main flow path has a tapering cross-section from a position connecting with the inlet port to a position contacting the sensing element;
    a laminarizing structure located in the inlet port and configured to direct the flowing media in a laminar flow pattern, wherein the laminarizing structure includes a plurality of fins around the inlet port and the outlet port, the fins around the inlet port extending between the inlet port and the main flow path to direct the flowing media in the laminar flow pattern.

13. The flow sensing system of claim 12, wherein the tapering cross-section takes a form of a rectangular shape and a wall angle of an external wall of the main flow path decreases from the position connecting with the inlet port to the position contacting the sensing element.

14. The flow sensing system of claim 13, an area of the tapering cross-section of the main flow path decreases from the position connecting with the inlet port to the position contacting the sensing element.

15. The flow sensing system of claim 12, wherein an additional laminarizing structure is located in the outlet port and configured to direct the flowing media in the laminar flow pattern.

16. The flow sensing system of claim 12 further comprising:
    a bypass flow path defined within the housing connecting the inlet port and the outlet port.

17. The flow sensing system of claim 12, wherein:
    the housing further includes a first portion and a second portion, wherein the first portion and the second portion define the main flow path, and
    the inlet port and the outlet port are defined by the first portion.

* * * * *